LEON L. WHEELESS, JR
GEORGE L. WIED
STANLEY F. PATTEN, JR.
GUNTER F. BAHR
INVENTORS

ATTORNEY

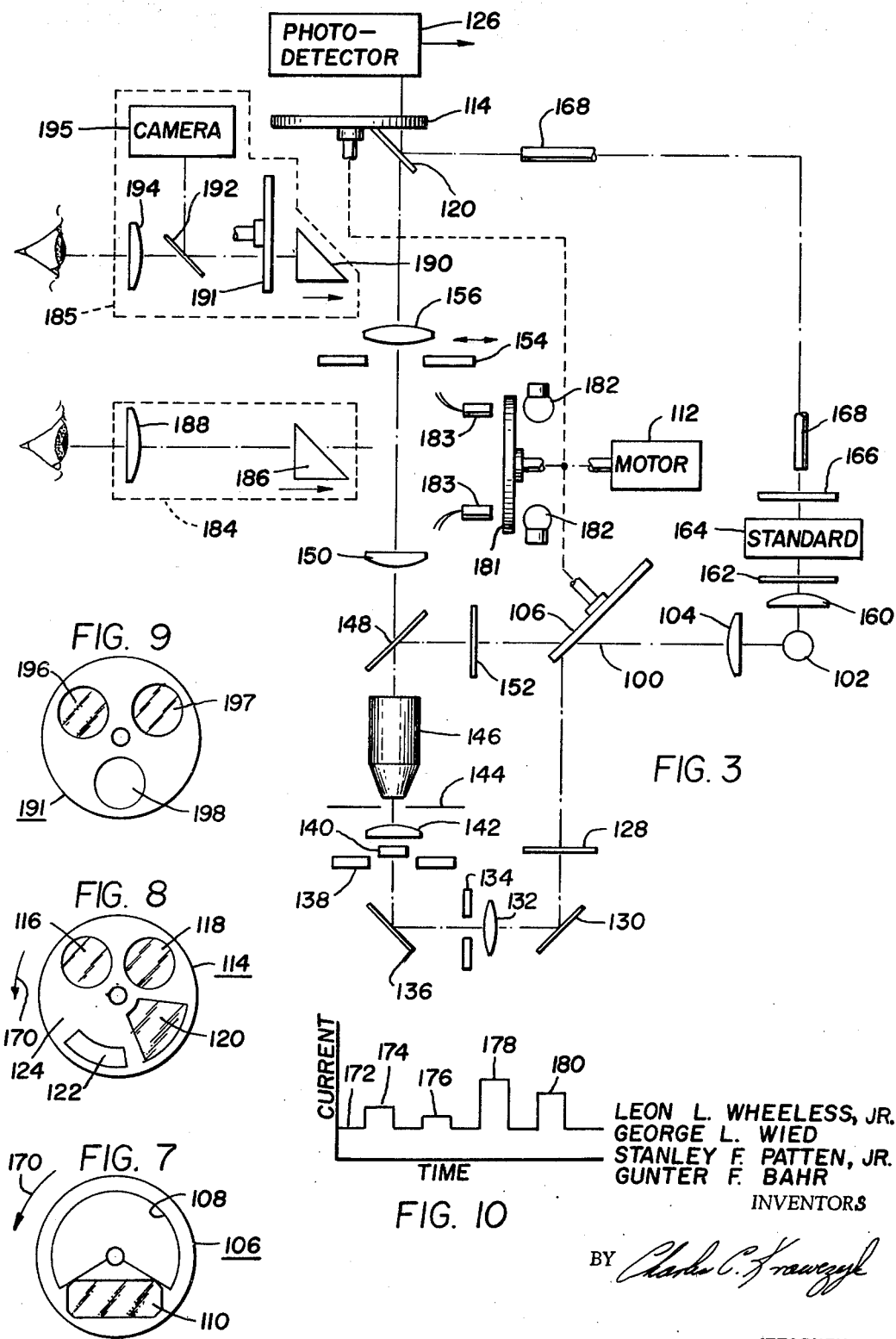

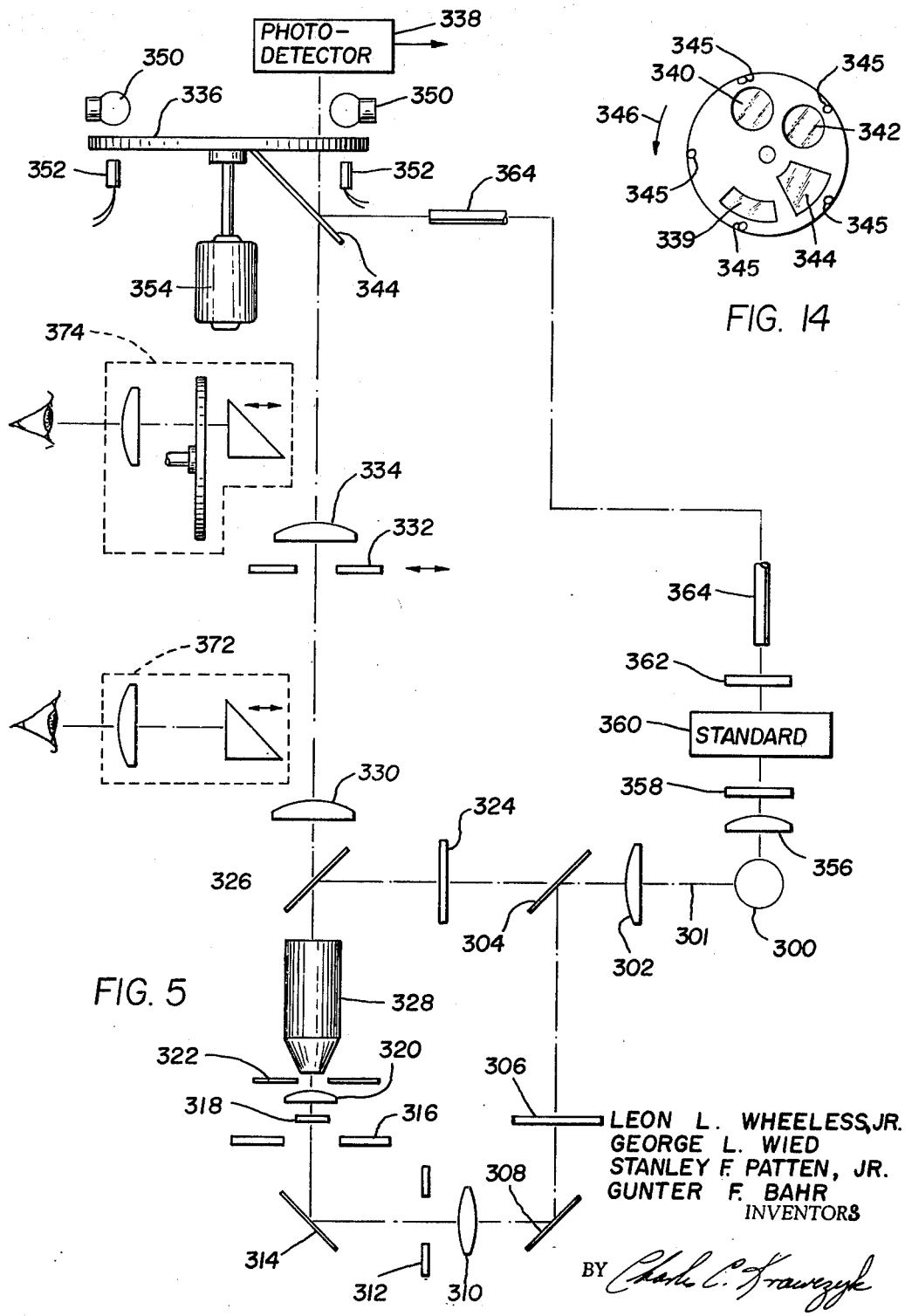

LEON L. WHEELESS, JR.
GEORGE L. WIED
STANLEY F. PATTEN, JR.
GUNTER F. BAHR
INVENTORS

BY Charles C. Krawczyk

ATTORNEY

LEON L. WHEELESS, JR.
GEORGE L. WIED
STANLEY F. PATTEN, JR.
GUNTER F. BAHR
INVENTORS

LEON L. WHEELESS, JR.
GEORGE L. WIED
STANLEY F. PATTEN, JR.
GUNTER F. BAHR
INVENTORS

United States Patent Office

3,497,690
Patented Feb. 24, 1970

3,497,690
METHOD AND APPARATUS FOR CLASSIFYING BIOLOGICAL CELLS BY MEASURING THE SIZE AND FLUORESCENT RESPONSE THEREOF
Leon L. Wheeless, Jr., Webster, N.Y., George L. Wied, Chicago, Ill., Stanley F. Patten, Jr., Penfield, N.Y., and Gunter F. Bahr, Chevy Chase, Md., assignors to Bausch & Lomb Incorporated, Rochester, N.Y., a corporation of New York
Filed Sept. 21, 1967, Ser. No. 669,479
Int. Cl. G01n 21/38
U.S. Cl. 250—71
24 Claims

ABSTRACT OF THE DISCLOSURE

Parameters for identifying cells derived from biologic material are achieved by measuring size and primary and/or secondary fluorescent characteristics of the cells. The measurements are achieved on individual cells by either a static or a flow through system. A photometer automatically measures the fluorescent characteristics of the cells at a plurality of wavelengths. The size of the cell is automatically measured photoelectrically by a scatter effect or scanning techniques, or electrically by a resistance type measurement. The signals corresponding to the measured parameters are processed by a computer to classify the cells in accordance with these parameters.

BACKGROUND OF THE INVENTION

This invention relates to a photoelectric apparatus for classifying cells of various types from biologic material.

The apparatus and methods of the invention are described in the context of classifying body tissue cells and more particularly to detection of abnormal cells derived from the female genital tract. However, it is to be understood that the apparatus and method disclosed herein is adaptable for classifying any type of cell that can be stained to fluoresce at one or more wavelengths or bands of wavelengths (secondary fluorescence), or spontaneously fluoresces (primary fluorescence) at one or more separate wavelengths. In addition to aiding in the detection and classification of cellular abnormality, the apparatus and method may have application in many other fields such as immuno-fluorescence, malaria studies, virus research, tissue culture research, and determining characteristic fluorescent fading curves of drugs, etc.

All tissues are composed of cells, the cell being the basic living unit of animal and plant matter. Many body organs are composed of or lined by epithelical tissue. As a result of continuous growth and replacement the most superficial cells of an epithelium are constantly shed and replaced by younger cells (spontaneous exfoliation). The exfoliated cells are found in body fluids such as secretions from the female genital tract, gastric fluid, sputum, or in various body cavities such as pleural fluid, peritoneal fluid, urine, cerebrospinal fluids, punctates exprimates or washings from epithelial surfaces. These exfoliated cells can be collected from certain body sites for microscopic examination. In addition, spontaneously exfoliated cells can be supplemented by cells obtained directly from certain organs by the use of suitable instruments. Such cells may be employed for detection and diagnosis of various pathologic conditions.

The detection of carcinoma (cancer) in the female genital tract is a prime example of the use of diagnostic cytology (human cell interpretation). Exfoliated cells which accumulate in the vagina together with cells scraped from the uterine cervix provide the cytopathologist with information for detecting carcinoma with high reliability rates. Early detection of carcinoma before it becomes advanced is important if significant cure rates are to be assured.

Presently, cytologic material from the vagina and/or uterine cervix and/or uterine cavity collected by a physician or trained paramedical personnel are smeared on the glass slides, fixed (to preserve morphologic and chemical structure) and are sent to a cytology laboratory wherein they undergo an elaborate staining procedure (e.g. Papanicoloau Stain). After staining the slides are scanned under a microscope by cytotechnicians trained to identify normal and abnormal cells. Any slides showing abnormal morphology and/or staining reaction are referred to the pathologist for final interpretation. The criteria used by cytotechnicians to distinguish normal from abnormal smears are quite subtle. A well trained cytotechnician will generally screen approximately 50 cases per day.

If such smear tests were obtained on all women on a regular basis to assure early detection of carcinoma, an excessively large number of cytotechnicians and pathologists would be nedeed to examine the cell samples. Furthermore, since the great majority of smears could be expected to be normal, it is apparent that some sort of automatic apparatus would be of significant value in screening out all obviously normal smears, leaving questionable and abnormal ones for further examination by cytotechnicians and pathologists.

It has been found that a relatively constant relationship exists between cell deoxyribonucleic acid (DNA) content, the ribonucleic acid (RNA) content, and the cell size in the normal cell as compared to various stages in carcinogenesis. Various automatic apparatus have been built to monitor cells based chiefly upon differences in cell area or size along with total cell radiation absorption or cell optical density. The reliability of such apparatus has proved to be extremely poor in separating the spectrum of cells under consideration. In order to effectively identify and distinguish normal cells from abnormal cells, separate measurements must be made of the RNA content, DNA content and cell size.

SUMMARY OF THE INVENTION

The present invention discloses a method of and apparatus for automatically identifying a spectrum of cells derived from biologic material. Cellular size and characteristics of cellular fluorescence are automatically individually monitored at at least one wavelength or a narrow band of wavelengths to provide electrical information signals corresponding to cell size, DNA content and RNA content. The information signals are utilized to classify the cells.

In a preferred embodiment the cells are stained with a fluorochrome dye and the secondary fluorescence of the stained cells is photoelectrically measured at a plurality of separated wavelengths or narrow bands of wavelengths to provide information corresponding to the cytochemical features of the cell. The cell size is also photoelectrically measured by a scatter effect. Alternatively, the cell size is measured by a change in the electrical resistance of a restricted flow channel due to the presence of the cell in the channel, or by means of television scanning techniques. The electrical signals are processed by a computer to classify the cells.

BRIEF DESCRIPTION OF THE DRAWINGS

FIGURE 3 is an optical schematic diagram of a first embodiment of the measuring unit of FIGURE 2.

FIGURE 5 is an optical schematic diagram of a third embodiment of the measuring unit of FIGURE 2.

FIGURE 7 is a plan view of a rotatable beam switch for the embodiment of FIGURE 3.

FIGURE 8 is a plan view of a rotatable filter wheel for the embodiment of FIGURE 3.

FIGURE 9 is a plan view of a filter wheel for the embodiment of FIGURE 3.

FIGURE 10 is a graphic illustration of the timing sequence of the electrical signals generated by the photodetector of FIGURE 3.

FIGURE 14 is a plan view of a combined filter and timing wheel for the embodiment of FIGURE 5.

DESCRIPTION OF THE PREFERRED EMBODIMENTS

Various studies have shown that cancer cells in general have an abnormal amount of nucleic acid. The excess DNA presumably is due to an abnormal mitotic process during rapid cell proliferation. Since RNA is necessary for protein synthesis, an accumulation of RNA is also frequently observed. However, malignant cells may have very little cytoplasm and therefore a relatively small amount of RNA. Thus an increase in DNA may be offset by a reduction in RNA. Accordingly, the amount or content of RNA and DNA must be established independently. Total absorption measurements, as generally made in the past, provided an indication of combined amounts of RNA and DNA and accordingly provided inadequate data for adequate cell separation.

The cells as described in the present application are stained by Euchrysine or Acridine Orange, a fluorochrome. The stained cell is irradiated or excited by an ultra-violet source such as a xenon lamp. The fluorochrome bounds to specific components of the cell and the cell is excited to emit light by a phenomena called secondary fluorescence. The nuclear DNA fluorescence may be measured in the range of wavelengths of 505–555 millimicrons while the cytoplasmic and nucleolar RNA fluorescence may be measured in the range of wavelengths of 560–670 millimicrons. Although the method and apparatus disclosed in the present application is described as employing Euchrysine or Acridine Orange stained cells, it is to be understood that other suitable fluorochromes may be used. Furthermore, the method and apparatus described herein may also function to identify cells that can be excited (without prior staining) to exhibit primary fluorescent characteristics at a plurality of separate wavelengths.

Figure 1:
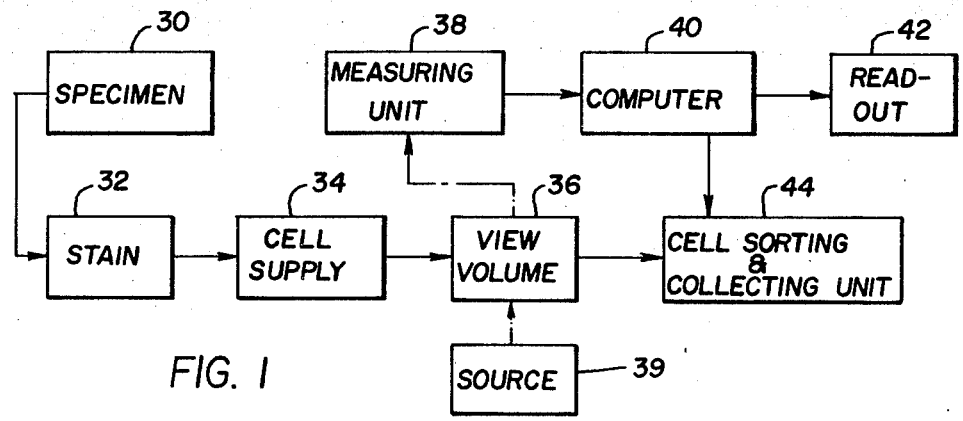
FIGURE 1 is a simplified block diagram including the invention.

FIGURE 1 is a simplified block diagram illustrating the method and apparatus for identifying cells. A specimen 30 to be tested is stained by a fluorochrome stain 32, such as Euchrysine or Acridine Orange, and is received by a cell supply unit 34. The cell supply unit 34 supplies individual cells to a view volume 36 wherein the size of the cells and the fluorescent characteristics of the cells are measured. A source 39 irradiates the cell in the view volume 36 to induce secondary fluorescence in the cell. A measuring unit 38, including a single or a plurality of photodetectors, receives the radiation and generates electrical information signals corresponding to the fluorescent characteristics of the cell at a pulrality of separate wavelengths or separate narrow bands of wavelengths and to the cell size. The cell size is measured either by a dark-field scatter effect, by a television raster system or an impedance type measurement as it flows through a restriction.

The electric signals from the measuring unit 38 corresponding to the cell size and the cell fluorescent characteristics are applied to a computer 40 for classification. In the present version, the cel's will be classified in accordance to the RNA content, DNA content and cell size. The computer 40 directs the cell classification signals to a readout device 42 and also applies control signals to a cell sorting and collection unit 44. The questionable ce'ls after passing through the view volume 36 may be separated from the normal cells by the cell sorting unit 44 in response to a control signal from the computer 40.

Figure 4:
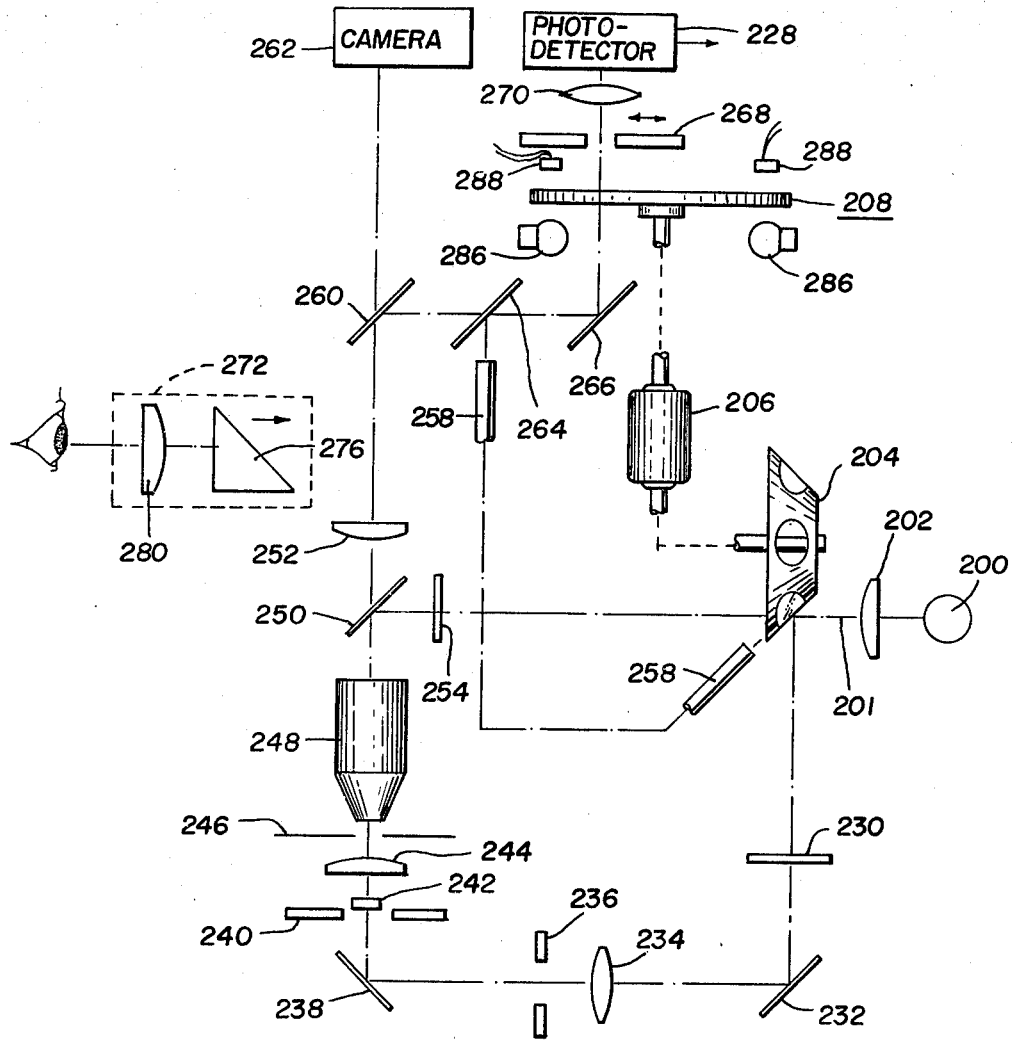
FIGURE 4 is an optical schematic diagram of a second embodiment of the measuring unit of FIGURE 2.
Figure 6:
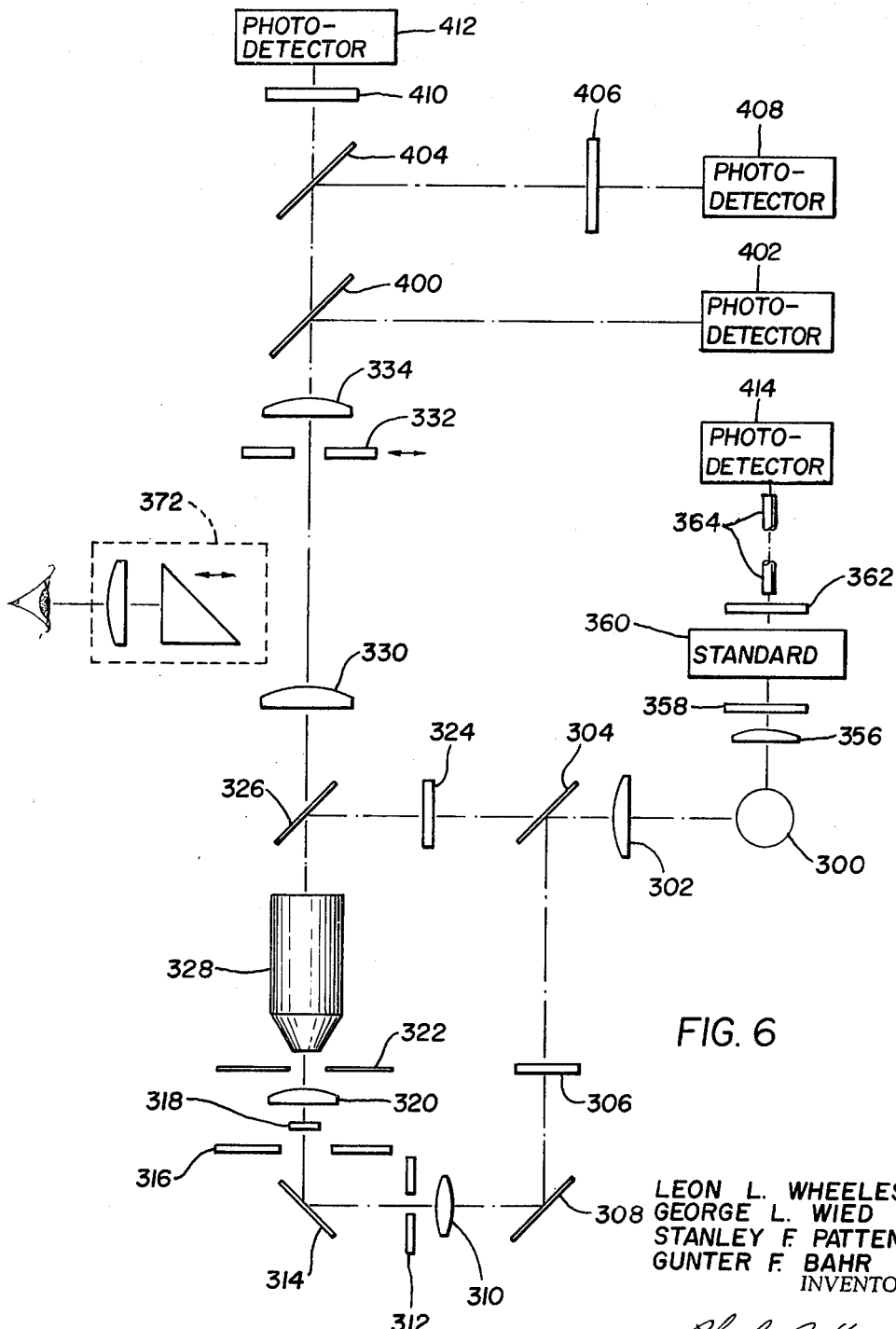
FIGURE 6 is an optical schematic diagram of a fourth embodiment of the measuring unit of FIGURE 2.

The measuring unit 38 may include a single photodetector as illustrated in the schematic diagrams of FIGURE 3, 4, and 5, alternatively the measuring unit can include a plurality of photodetectors, one for each parameter being measured as illustrated in the schematic diagram of FIGURE 6. The size measurements in the view volume can be made by a scatter effect as illustrated in the schematic diagrams of FIGURES 3–6, or by an impedance type measurement with the apparatus of FIGURES 15 and 16, or by a vidicon raster system of FIGURE 17.

Figure 2:
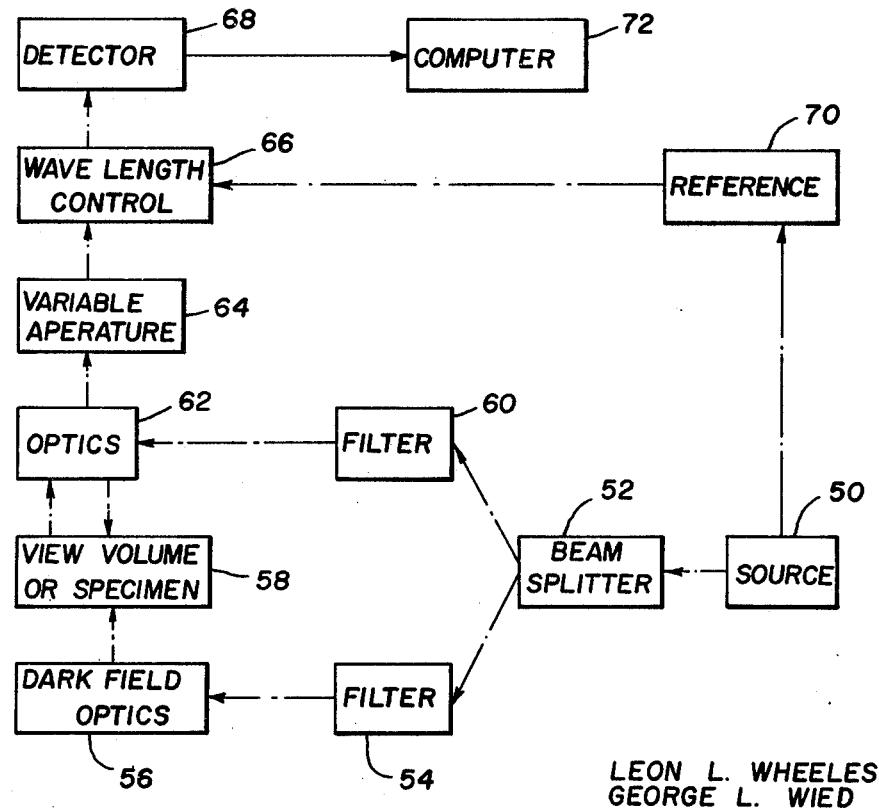
FIGURE 2 is an expanded block diagram of the measuring unit of FIGURE 1.

The block diagram of FIGURE 2 is an expanded block diagram of an embodiment of the measuring unit 38 of FIGURE 1. Radiation from a source 50 is divided into two separate paths by a beam splitter 52. The first path includes a filter 54 that controls the wavelength of the radiation applied to the dark field optics 56 for illuminating a view volume or specimen 58 for forward scatter measurements of the cell size. The second path includes a second filter 60 for controlling the wavelength applied through the optical unit 62 to the view volume 58 for inducing secondary fluorescence in the cell. The fluorescent wavelengths (primary fluorescence or secondary fluorescence) and the forward scatter radiation are directed from the view volume 58 through the optical unit 62, a variable aperture 64 and a wavelength control unit 66 to a detector unit 68. The variable aperture 64 limits the measured radiation to a single cell. The wavelength control unit 66 can include a filter wheel for sequentially controlling the wavelengths applied to the detector unit 68 for measurements of cell size and fluorescent responses at a plurality of separate wavelength corresponding to the schematic diagrams of FIGURES 3–5. If the beam splitter 52 includes a chopper type beam splitter, its operation is synchronized with the operation of the filter wheel as illustrated in FIGURES 3 and 4. Alternatively, the wavelength control unit 66 can include a plurality of dichroic mirrors for controlling the wavelengths received by a plurality of detector devices as illustrated in FIGURE 6. A beam of radiation is also directed from the source 50 through a reference unit 70 to the wavelength control unit 66 to provide a reference beam for correcting for changes in the response of the source 50 and the detector 68. The signals from the detector unit 68 are directed to a computer 72 for automatically classifying the cells.

The optical schematic diagrams of FIGURES 3 and 4 are embodiments of the measuring unit of FIGURE 1 for photoelectrically generating electrical signals corresponding to the fluorescent characteristics of the cell presently in the view volume at a plurality of separate wavelengths and the size of the cells. These embodiments use a rotatable filter wheel and a rotatable chopper type beam switch. In FIGURE 3 a beam of radiation 100 is directed from a xenon source 102 by a collimating lens 104 towards a rotatable chopper type beam switch 106. A plan view of the beam switch is illustrated in FIGURE 7. The beam switch 106 includes an opening 108 extending over a major portion of the beam switch 106 and a mirror 110 extending over a smaller portion. The beam switch 106 is driven by a motor 112.

A filter wheel 114 is also coupled to the motor 112 for synchronized rotation with the beam switch 106. The filter wheel 114 (FIGURE 8) includes filters 116, 118, a 45° diffuse reflector 120, an opening 122 and an opaque portion 124.

The operation of the filter wheel 114 is synchronized to the beam splitter 106 so that when the beam 100 passes through the opening 108, the filters 116 and 118 are sequentially positioned before a photodetector 126. When the beam 100 is reflected by the mirror 110 the opening 122 is positioned before the photodetector 126.

The beam switch mirror 110 (when positioned in the beam 100) reflects the beam 100 through a filter 128 designed for passing wavelengths greater than 550 millimicrons. The beam passing through the filter 128 is reflected by a mirror 130 to pass through a relay lens 132, a field aperture 134 and is reflected by a mirror 136 through an iris 138, a dark field stop 140 and a lens 142 to illuminate a specimen plane or view volume 144 with a hollow cone of radiation for measuring cell size by a forward scatter effect.

When the beam 100 passes through the opening 108, the beam is directed towards a filter 152 for passing radiation wavelengths between the range of 300–500 millimicrons. The filtered beam is reflected by a beam splitter 148 towards a microscope objective 146 to irradiate a cell in the specimen plane 144 to induce fluorescence. The radiation scattered from the cell, the radiation reflected from a cell and the fluorescence response of the cell (primary or secondary fluorescence), pass through the microscope objective 146, the beam splitter 148, a lense system 150, a variable aperture 154, a lens system 156 and the filter wheel 114 towards the photodetector 126. The variable aperture 154 limits the beam of radiation directed towards the photodetector to that received from a single cell. The lens system 156 focuses the exit pupil of the optical system 150 on the photodetector 126 to assure the same portion of the photodetector is irradiated by each cell tested.

Radiation from the source 102 is also directed through a collimating lens 160, a filter 162 (for passing wavelengths between the range of 300–500 millimicrons), a reference standard glass 164 (such as uranium glass), a filter 166 (which is the same as filters 116 or 118 or a filter having a response which is a combination of both) and an optical fiber bundle 168 towards the mirror 120 on filter wheel 114.

As the beam switch 106 and the filter wheel 114 are rotated in the directions designated by the arrows 170 of FIGURES 7 and 8, the photodetector 126 generates the electric information signals as illustrated in FIGURE 10. The filter wheel 114 can be separated into five portions. Four portions include the opaque portion 124, the filters 116 and 118 and the 45° diffuse reflector 120 (the filters 116 and 118 intercept the beam when the beam 100 passes through the opening). These sequentially generate a dark current level 172, a DNA pulse 174, an RNA pulse 176 and a reference pulse 178. A size pulse 180 is generated when the mirror 110 reflects the beam to provide a dark field wherein the fifth portion (the opening 122), of the filter wheel 114 intercepts the beam.

Motor 112 also drives a timing wheel 181. The timing wheel 181 includes a plurality of holes that pass between light sources 182 and photodetectors 183 to provide timing signals to the computer for identifying the particular signals generated by the photodetector 126.

Visible observation of the cell is provided by two removable optical systems included within the dashed blocks 184 and 185. The block 184 includes a prism 186 that moves into the beam and reflects the radiation to an eyepiece 188. The block 185 includes a prism 190 adapted to direct a beam through a rotatable filter wheel 191 and a beam splitter 192 to an eyepiece 194 and a camera 195. The filter wheel 191 (as illustrated in FIGURE 9) includes a pair of filters 196 and 197 corresponding to the filters 116 and 118 respectively, and an opening 198. With the use of the filter whel 191 the secondary fluorescense proportional to RNA and DNA and the forward scattered light of the cell can be observed and/or photographed.

Figures 11, 12:
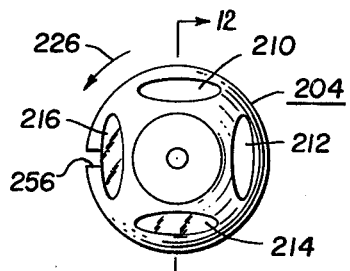
FIGURE 11 is a plan view of a combination beam switch and filter wheel of the embodiment of FIGURE 4.
FIGURE 12 is a cross-sectional view of the combined beam switch and filter wheel of FIGURE 11 taken along the lines 12—12.

In the embodiment of FIGURE 4 a beam of radiation 201 from a xenon source 200 is directed through a collimating lens 202 towards a rotatable combination filter-beam switch 204 having the shape of a frustrum of a cone. The beam switch 204 is driven by a motor 206 which also drives a filter wheel 208. The beam switch 204 (FIGURE 11) includes the open sections 210 and 212, a mirror 214 and a reference glass 216 (e.g. uranium glass). The filter wheel 208 (FIGURE 13) includes four narrow band pass filters 218, 220, 222, and 224 for passing a narrow band of wavelengths about 535 millimicrons, 535 millimicrons, 590 or 655 millimicrons and 401 millimicrons, respectively, for indicating reference, DNA content, RNA content and cell size, respectively. As the beam switch 204 and the filter wheel 208 are rotated in the directions designated by the arrows 226, the filters 218, 220, 222, and 224 are sequentially positioned to allow radiation to pass to a photodetector 228 while the beam 201 is sequentially directed towards the reference glass uranium sample 216, the openings 210 and 212, and the mirror 214, respectively.

When the mirror 214 moves into the beam 201, the beam is reflected through a filter 230 passing radiation around 400 millimicrons. The filtered beam is reflected by a mirror 232 through a relay lens 234, a field aperture 236, and is reflected by a mirror 238 through an iris 240, a dark field stop 242 and a lens 244 to direct a hollow cone of radiation towards the specimen plane 246 for forward scatter cell size measurements.

The openings 210 and 212 in the chopper 204 pass the beam 201 through a band pass filter 254 (passing radiation between 300–500 millimicrons) for reflection by the beam splitter 250 towards the microscope objective 248 for irradiating the cell in the specimen plane to induce secondary fluorescence. The forward scatter from the cell, the radiation reflected from the cell and the secondary fluorescence of the cell are directed back through the microscope objective 248 and the beam splitter 250 towards a lens system 252. When the reference sample 216 (e.g. uranium glass) is in the beam radiation is directed through an opening 256 (FIGURE 11) towards an optical fiber bundle 258.

The lens system 252 directs a beam of radiation from the microscope objective 248 towards a beam splitter 260, which directs a portion of the beam towards a camera 262 and another portion past a beam splitter 264 toward a mirror 266. The beam splitter 264 serves to direct light received from the fiber bundle 258 towards the mirror 266. The mirror directs the beam through the filter wheel 208, a variable aperture 268 and a focusing lens 270 to the photodetector 228. The lens 270 focuses the exit pupil of the optical system on the photodetector to insure the same portion of the photodetector 228 receives the radiation signals from the cells as the variable aperture 268 is changed.

Figure 13:
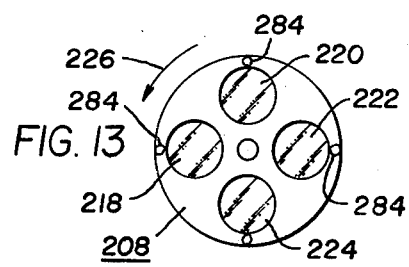
FIGURE 13 is a plan view of a combined filter and timing wheel for the embodiment of FIGURE 4.

As the beam switch 204 and the filter wheel 208 are rotated by the motor 206, the photodetector 228 generates electrical information signals similar to that illustrated in FIGURE 10. A dark current reading can be taken between any of the pulses rather than a specific period as provided for in the apparatus of FIGURE 3. Timing signals are provided for identifying the signals generated by the photodetector 228 by a plurality of holes 284 located about the outer edge of the filter wheel 208, as best seen in FIGURE 13. As the filter wheel 208 rotates, light from the sources 286 pass through holes 284 to the photodetectors 288 to generate electrical signals thereby designated the particular measurement being made. The tests may be observed through a removable eyepiece (enclosed within the dashed box 272) including the prism 276 and the eyepiece 280. The prism can be moved into the adjacent beam for visual observation of the measurements.

FIGURE 5 is an embodiment using a single movable filter wheel as the wavelength control. A beam of radiation 301 from the xenon source 300 is directed by a collimating lens 302 towards a stationary beam splitter 304. A portion of the beam 301 is directed through a filter 306 which passes a band of wavelengths between 350 to 400 millimicrons. The filtered beam is reflected by a mirror 308 through a relay lens 310, a field aperture 312 for reflection by a mirror 314 through an iris 316, a dark field stop 318 and a lens 320 to provide a cone of light for forward scatter cell size measurements on the specimen plane 322.

The other portion of the beam 301 from the beam splitter 304 passes through a filter 324 (passing wavelengths between 400–500 millimicrons) and is reflected by a dichroic mirror 326 through a microscope objective 328 to irradiate the cell in the specimen plane for inducing fluorescence. The dichroic mirror 326 passes the radiation received from the microscope objective 328 above 500 millimicrons and below 400 millimicrons through a lens system 330, a variable aperture 332, a focusing lens 334 and a filter wheel 336 towards a photodetector 338.

A plan view of the filter wheel 336 is illustrated in FIGURE 14. The filter wheel 36 includes filters 339, 340, and 342 which pass radiation between 350–400 millimicrons, 530 millimicrons, and 590 or 650 millimicrons, respectively, and also includes a reflective diffuser 344. The filter wheel 336 also includes a plurality of holes 345 mounted about its circumference to provide timing signals for the computer as the holes 345 pass between lights 350 and photodetectors 352 for identifying the signal generated by the photodetector 338. As the filter wheel is rotated in the direction illustrated in FIGURE 14 by the arrow 346 by a motor 354, the photodetector 338 generates a series of pulses indicating RNA content, DNA content, reference and size similar to those pulses illustrated in FIGURE 10.

A beam of radiation is also directed by a lens 356 through a filter 358 (passing a range of wavelengths between 350–400 millimicrons), a standard glass 360 (uranium glass), a filter 362 (corresponding to filters 340 or 342 or a response which is a combination thereof) and through an optical fiber bundle 364 towards the filter wheel 336 to be reflected towards a photodetector 338 by the reflective diffuser 344 to provide a reference signal. The two eyepieces enclosed within the dashed blocks 372 and 374 are adapted to be inserted into the adjacent beam for visual observation of the tests as previously set forth in FIGURES 3 and 4.

The embodiment of FIGURE 6 is similar to that of FIGURE 5 with the exception that the movable filter wheel 336 of FIGURE 5 has been removed and replaced by the use of four photodetectors, two dichroic mirrors, and two stationary filters. Accordingly, the same reference numerals designate similar components in FIGURES 5 and 6, whatever practical. The beam of radiation from the dichroic mirror 326 is directed by the lens system 330 and 334 towards a second dichroic mirror 400. A beam of radiation below 400 millimicrons is reflected by the dichroic mirror towards a "cell size" photodetector 402. The wavelengths above 400 millimicrons pass through the dichroic mirror 400 to a dichroic mirror 404. The dichroic mirror 404 reflects radiation below 600 millicrons through a filter 406 (peaked to pass 530 millimicrons) towards a DNA photodetector 408. Radiation above 580 millimicrons passes through the dichroic mirror 404 and a filter 410 (peaked at 590 or 650 millimicrons) towards a RNA photodetector 412. The radiation from the fiber bundle 364 is directed towards the fourth photodetector 414 for providing a reference signal. This embodiment is particularly adapted for use in flow through type apparatus to provide continual signals for the computer indicating the reference signal, cell size, the DNA content and the RNA content.

FIGURE 6 can be modified for only dark field illumination by eliminating the beam splitter 326 and replacing the beam splitter 304 with a mirror. The filter 306 would be replaced with a filter passing 300–500 mm. In this embodiment, the specimen plane or view volume would thus be illuminated dark field with radiation between 300–500 mm. The dichroic mirror 400 would be replaced with one reflecting wavelengths below 500 mm. and passing wavelengths above 500 mm. Thus the forward scatter between 300–500 mm. would be measured by the detector 402 giving a signal proportional to cell size. Secondary fluorescence would be measured by the detectors 408 and 412 as previously set forth.

Figure 15:
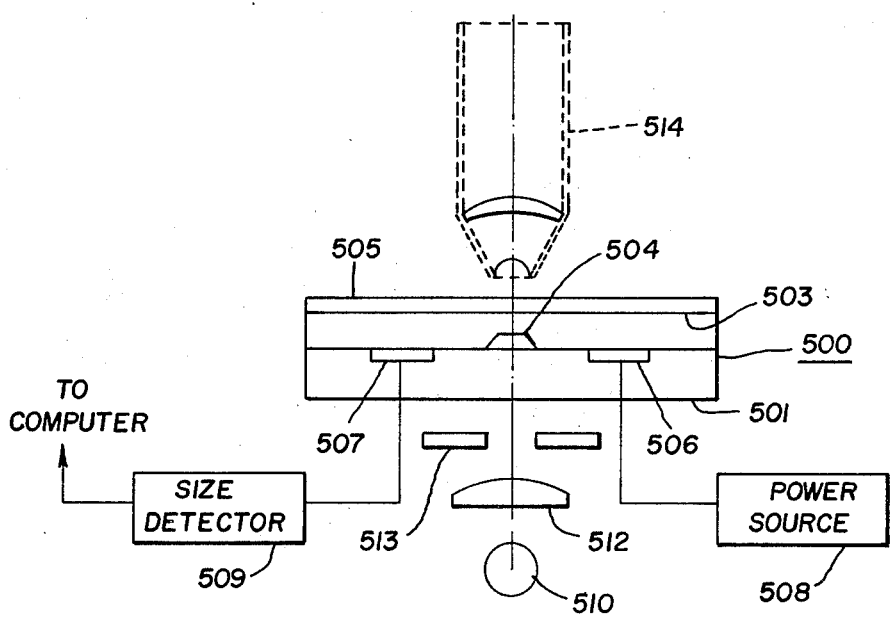
FIGURE 15 is a schematic diagram of a flow through specimen plane including an impedance type cell size measuring system.
Figure 16:
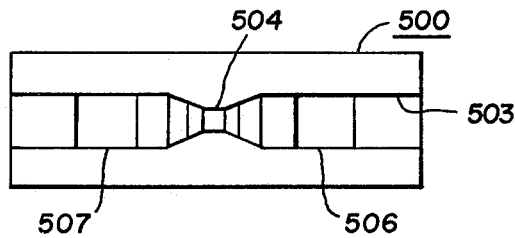
FIGURE 16 is a top view of the specimen plane of FIGURE 15.

An embodiment of a flow through specimen plane 500 is illustrated in FIGURES 15 and 16 providing an impedance type of measurement for determining the size of the cells. The specimen plane 500 comprises a clear glass base 501, such as a microscope slide, including a channel 503 with a restriction 504 suitably etched in the glass base. A clear glass cover 505 is cemented onto the base 501 to entirely enclose the channel 503 and provide a flow through tube. The restriction 504 can, for example, have a cross-sectional area in the order of 100 microinches square and a length in the order of 100 microinches. A pair of platinum electrodes 506 and 507 are located at opposite ends of the restriction. The electrode 506 is connected to a suitable power source 508 while the electrode 507 is connected to a size detector circuit 509. The size of the cell is determined by the change in the impedance between the electrodes 506 and 507 by a well-known "Coulter" type measurement illustrated in a U.S. patent No. 2,656,508 thereby requiring no further explanation. The signal from the size detector 509 is transmitted to the computer. Since the specimen plane 500 comprises clear glass, the radiation for inducing cell fluorescence is provided by a source 510 located below the specimen plane. A beam of radiation is directed by a collimating lens 512, a field stop 513, through the restriction 504 in the specimen plane to a microscope objective 514. The fluorescent response of the cell is measured in a manner as previously set forth with regards to FIGURES 3–6.

Figure 17:
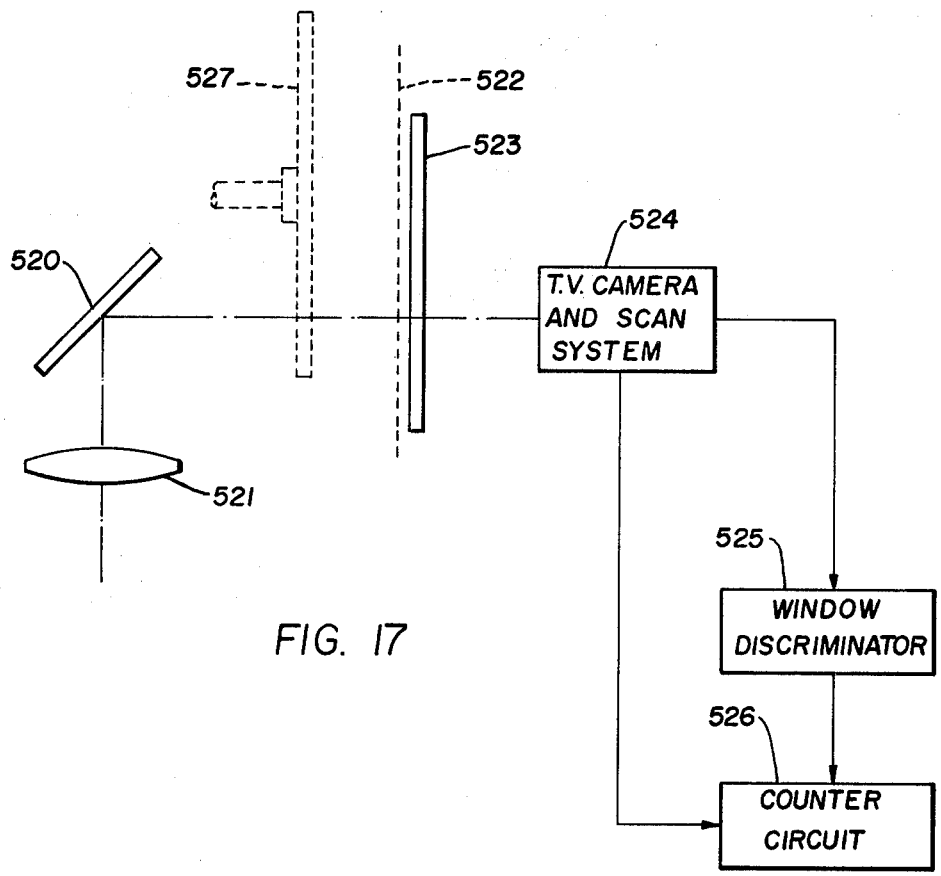
FIGURE 17 is a schematic diagram of a vidicon scanning size measuring system.

The embodiments of FIGURES 3–6 can be modified to include the vidicon or television scanning cell size measuring system illustrated in FIGURE 17. A beam splitter 520 directs a portion of the beam from the lens system 521 (corresponding to the lens system 150, 252, and 330 of FIGURES 3–6) to develop an image of the cell at an image plane 522. A mask 523 is positioned along the image plane 522. The mask 523 includes a large number of uniformely spaced small holes extending therethrough. The size of each hole is much smaller than the image of the cell so that the image illuminates a large number of holes (depending upon the size of the cell).

A television camera and scan system 524 scans the mask 523 to generate a pulse type signal each time an illuminated hole is traversed. The pulse type signals are applied to a "window" type discriminator circuit 525. The discriminator circuit 525 accepts signals having amplitudes within a limited range, generally called a "window." For example, the discriminator circuit 525 rejects low level signals due to noise or partial scanning of a hole, and high level signals such as sync and scan signals. The pulse type signals within the "window" are applied to a counter circuit 526 that provides a reading proportional to the number of holes illuminated by the cell image. Since the holes are smaller than the size of the image of the cell, the number of holes illuminated by the cell image provides an indication of cell size. A control signal is also applied from the television camera and scan system 524 to the counter circuit 526 to designate when a new cell is to be scanned.

Since DNA is concentrated in the cell nucleus and RNA is primarily concentrated in the cytoplasm, a filter wheel 527 can be inserted as illustrated by dashed lines in FIGURE 17. The filter wheel can include two filters, one to pass the fluorescent radiation corresponding to DNA (a filter within the range of 505–555 millimicrons) and the other to pass fluorescent radiation corresponding to RNA (a filter within the range of 560–670 millimicrons). By selectively positioning the filters into the beam, a measurement can be made of nucleus size as well as total cell size.

In operation, the parameters of a plurality of references cells are first measured to provide normalizing signals for the computer for compensating for possible minor changes in system parameters and possible different degrees of staining. Thereafter the test cells are measured. In a static type system wherein the cells are fixed on a microscopic slide, a number of readings are also taken of the area surrounding the cells to provide signals corresponding to background fluorescence between cells.

Figure 18:
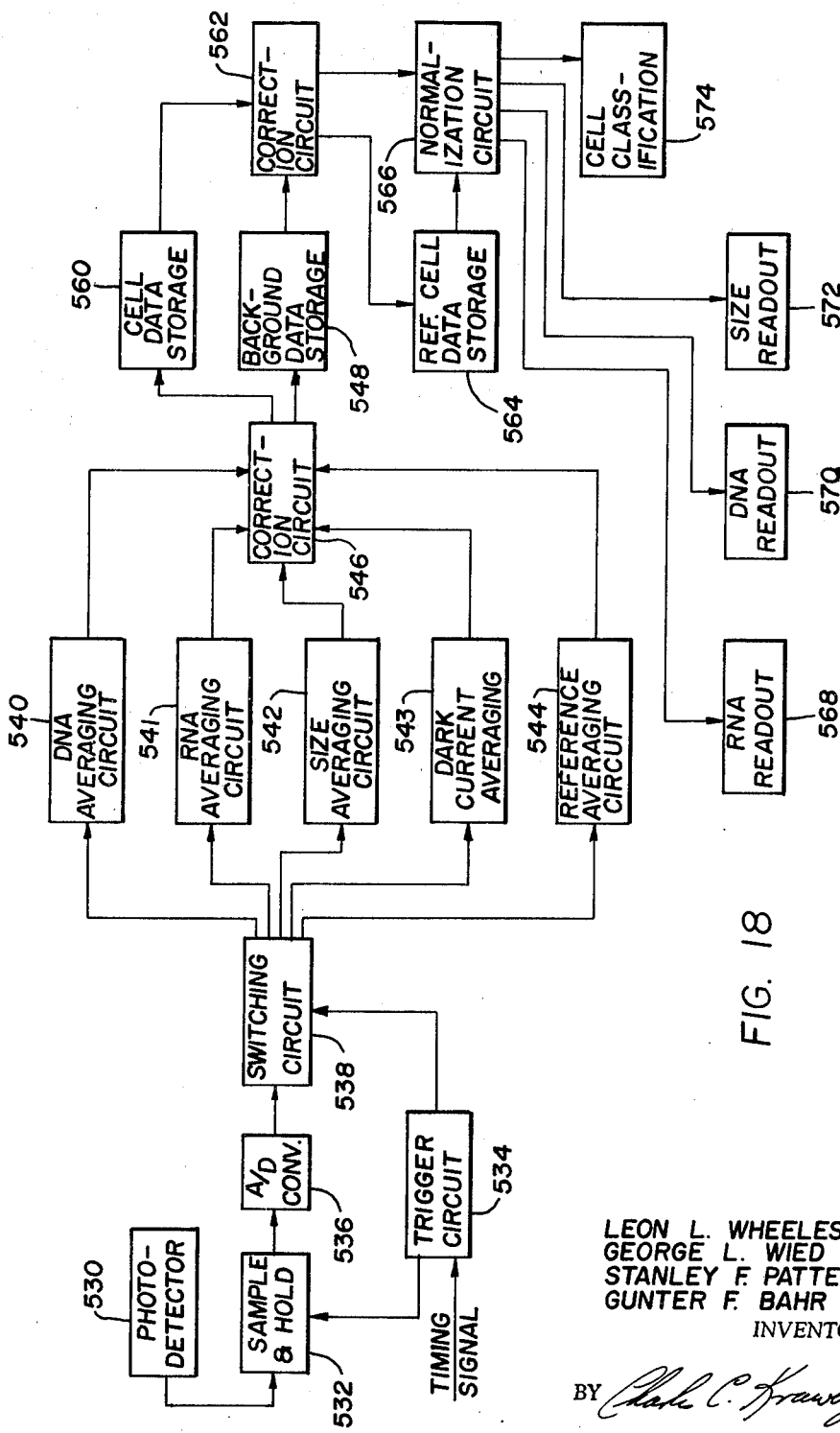
FIGURE 18 is a block diagram of an information processing system for use with the embodiments of FIGURES 3, 4, and 5.

The block diagram of FIGURE 18 illustrates the functions performed by a computer for classifying the cells and is adapted to be connected to the single photodetector measuring units of FIGURES 3–5. The cell and background signals from a photodetector 530 are applied to a sample and hold circuit 532 in response to the measuring unit timing signals applied to a trigger circuit 534. The sample and hold circuit 532 sequentially samples each photomultiplier signal a number of times. The sampled signal is applied through an analog-to-digital converter 536 to a switching circuit 538. The switching circuit 538 is responsive to a signal generated by the trigger circuit 534 to identify the particular signal pulse generated by the photodetector and thereby channel the digital signal to the correct averaging circuit.

Five averaging circuits 540–544 receive DNA, RNA, size, dark current, and reference digital signals respectively, and average the associated signals over the number of samples taken on each cell.

The outputs of the averaging circuits 540–544 are coupled to a correction circuit 546 which subtracts the dark current readings and normalizes the readings in accordance with the reference signal.

The digital signals corresponding to the background data and the cell parameter data are stored in the storage circuits 548 and 560, respectively. The stored cell and background data are applied to a second correction circuit 562 which subtracts the background fluorescence from the cell data to provide a signal directly related to the parameters of the cell alone. When the reference cells are being measured the ouptut from the second correction circuit 562 is applied to a reference cell data storage circuit 564 for storing the RNA content, DNA content and all size signals corresponding to the reference cells. When the sample or test cells are being tested by the measure unit, the signals from the second correction circuit 562 and the reference cell data storage circuit 564 are applied to a normalization circuit 566 which normalizes the sample cells in accordance with the parameters of the reference cells. The output of the normalization circuit 566 is connected to the RNA readout 568, DNA readout 570, and the cell size readout 572, and also to a cell classification circuit 574 which designates the cell into a plurality of separate classes.

Figure 19:
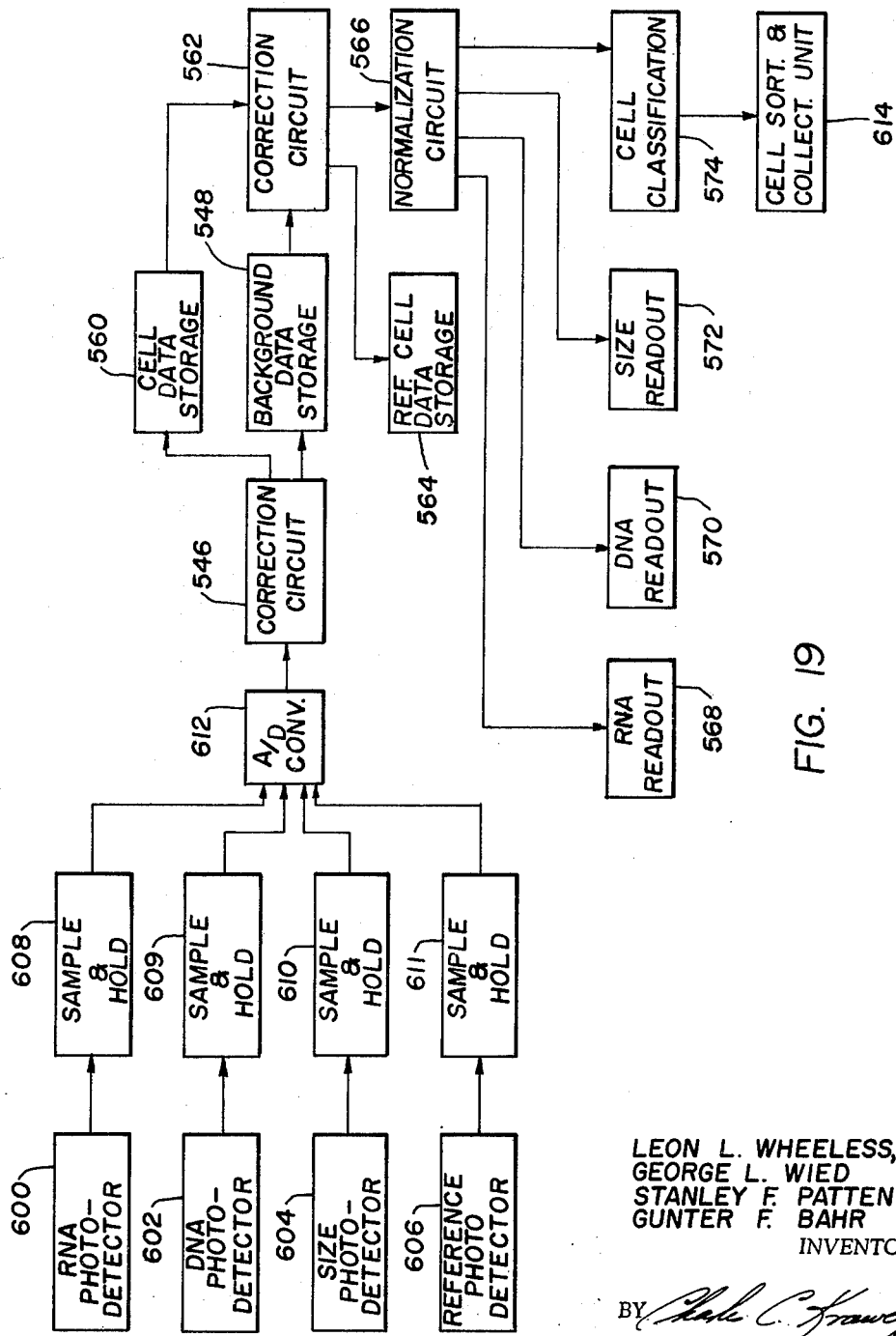
FIGURE 19 is a block diagram of a computer for use with the embodiments of FIGURE 6.

The block diagram of FIGURE 19 illustrates a modification of the block diagram of FIGURE 18 for use with the plural photodetector measuring unit of FIGURE 6. Wherever practical, the same components in FIGURES 18 and 19 are designated by the same reference numerals. The photodetectors 600, 602, 604, and 606 generate the RNA, DNA, size and reference signal and are connected to separate sample and hold circuits 608–611. The signals from the sample and hold circuits 608–611 are coupled through a digital-to-analog converter 612 to the correction circuit 546. The remaining portion of the block diagram of FIGURE 19 functions in the same manner as previously set forth with regards to FIGURE 18. A control signal from the cell classification unit is applied to a cell sorting and collecting unit 614 to separate the suspicious cells from the normal cells.

What is claimed is:
1. Apparatus for classifying cells derived from biologic material comprising:
   first means for automatically measuring the size of the cells, and
   second means for automatically measuring the fluorescent response of the cells at a plurality of separate wavelengths.
2. Apparatus as defined in claim 1 wherein:
   said cells are stained with a fluorochrome to induce secondary fluorescence and
   said second means photoelectrically measures the secondary fluorescence of said cells at at least two separate bands of wavelengths.
3. Apparatus as defined in claim 2 wherein said first means photoelectrically measures the size of said cells by a radiation scatter effect.
4. Apparatus as defined in claim 2 wherein:
   said fluorochrome comprises a solution including euchrysine; and
   said second means photoelectrically measures secondary fluorescence at a first selected band of wavelengths within the wavelength range of 505–555 millimicrons and at a second selected band of wavelengths within the wavelength range of 560–670 millimicrons.
5. Apparatus as defined in claim 1 wherein said first means comprises a photoelectric scanning system for scanning an image of a cell and determining the size thereof.
6. Apparatus as defined in claim 1 wherein said first means comprises means for flowing the cells through a restricted channel and means for measuring the change in impedance in said channel due to the presence of a cell therein.
7. A method of classifying cells derived from biologic material comprising:
   staining the cells with fluorochrome;
   measuring the size of the cells;
   exciting secondary fluorescence in said cells, and
   measuring the secondary fluorescence of cells at at least two separate narow bands of wavelengths.
8. A method as defined in claim 7 wherein:
   said fluorochrome dye comprises a solution including euchrysine, and
   said measurement of secondary fluorescence is made at a first selected band of wavelengths within the wavelength range of 505–555 millimicrons and at a second selected band of wavelengths within the wavelength range of 560-670 millimicrons.
9. A system for classifying cells stained with a fluorescent dye comprising:
   means for irradiating said cells;

means for measuring the size of said cells, and means for measuring the amount of secondary fluorescence of said cells at at least two narrow bands of wavelengths.

10. Apparatus for classifying fluorochrome stained cells comprising:
optical system including a specimen plane for receiving said cells;
radiation sensitive means for generating an electric signal in response to radiation applied thereto positioned to receive radiation from said optical system;
source means for irradiating said specimen plane to cause a cell positioned therein to produce secondary fluorescence and to scatter applied radiation, and
means directing said secondary fluorescence and said scatter radiation signals from said optical system to said radiation sensitive means so that said radiation sensitive means generates electric signals corresponding to the amount of secondary fluorescence at a plurality of separate wavelengths and the size of said cell.

11. Apparatus as defined in claim 10 wherein said source means includes:
optical means for directing radiation through said specimen plane to said optical system to provide a dark field illumination of said specimen plane.

12. Apparatus as defined in claim 11 wherein said source means includes:
optical means for directing radiation through said optical system to said specimen plane for irradiating said cells to induce secondary fluorescence.

13. Apparatus as defined in claim 12 wherein:
said radiation sensitive means includes a single photodetector, and
said means for directing said secondary fluorescence and scatter radiation signals includes optical means for periodically limiting the wavelength of radiation received by said photodetector.

14. Apparatus defined in claim 12 wherein:
said radiation sensitive means include a plurality of photodetectors corresponding to the number of measurements to be made at said plurality of separate wavelengths and the size measurement, and
said means for directing said secondary fluorescence and scatter radiation signals includes optical means for selectively directing the wavelengths of radiation received from said optical system to selected ones of said plurality of photodetectors.

15. Apparatus as defined in claim 10 wherein said source means includes:
first optical means for providing dark field illumination of said specimen plane;
beam switching means for sequentially directing a beam of radiation from said source along two separate paths;
second optical means positioned in one of said paths to direct a beam of radiation toward said first optical means; and
third optical means positioned in said other path for directing a beam of radiation through said optical system to said specimen plane.

16. Apparatus as defined in claim 15 wherein:
said means for directing radiation includes movable means synchronized to said beam switching means having a plurality of filters for sequentially controlling the wavelengths of the radiation received by said radiation sensitive means.

17. Photoelectric apparatus for classifying cells derived from biologic material comprising:
means for receiving said cells;
means for irridiating said cells to cause fluorescence;
photoelectric means for generating electrical signals in response to radiation applied thereto;
means directing radiation from a single cell to said photoelectric means so that said photoelectric means provides signals corresponding to the intensity of the cell fluorescence at a plurality of separate bands of wavelengths, and
means for measuring the size of said cells.

18. Photoelectric apparatus as defined in claim 17 wherein said means for measuring the size of said cells comprises:
a mask formed with a large number of small holes spaced in a uniform pattern;
means for directing an image of a cell on said mask so that said image illuminates a plurality of holes, and
photoelectric means for providing a signal proportional to the number of holes illuminated by said cell image.

19. Photoelectric apparatus for classifying cells derived from a biologic sample comprising:
first means for receiving said cells;
second means for irradiating said cells to cause fluorescence;
third means for providing dark field illumination of said first means for measuring the size of cells through a scatter effect;
photoelectric means for generating an electric signal in response to radiation applied thereto, and
fourth means for directing fluorescent radiation and scatter radiation from a single cell to said photoelectric means so that said photoelectric means generates signals corresponding to the size of said cell and the amount of the cell fluorescence at a plurality of separate wavelengths.

20. A photoelectric apparatus as defined in claim 19 wherein:
said photoelectric means include a plurality of photoelectric devices, one for size measurement and one for each separate fluorescent wavelength measurement;
said second means includes a first filter for controlling the wavelength range of radiation applied to said cells;
said third means includes a second filter for controlling the wavelength range of said dark field illumination, and
said fourth means includes a plurality of filter means for selectively controlling the wavelength of radiation to said plurality of photoelectric means.

21. A photoelectric apparatus as defined in claim 19 wherein:
second means includes a first filter for controlling the wavelength range of radiation applied to said cells;
said third means includes a second filter means for controlling the wavelength range of said dark field illumination, and
said fourth means includes movable filter means for sequentially controlling the wavelengths of radiation applied to said photoelectric means.

22. A photoelectric apparatus as defined in claim 21 including beam switching means synchronized to said movable filter means for sequentially directing radiation from a source through said second and third means.

23. A photoelectric apparatus as defined in claim 19 including means for directing a reference beam of radiation toward said photoelectric means.

24. A photoelectric device as defined in claim 20 including:
another photoelectric device, and
means for directing a reference beam of radiation towards said another photoelectric device.

References Cited

UNITED STATES PATENTS

| | | | |
|---|---|---|---|
| 3,092,722 | 6/1963 | Howerton | 250—83 X |
| 3,306,156 | 2/1967 | Glasser et al. | 356—51 |

(Other references on following page)

UNITED STATES PATENTS

| | | | |
|---|---|---|---|
| 3,316,896 | 5/1967 | Thomasset | 324—711 |
| 3,327,117 | 6/1967 | Kamentsky | 250—83.3 |
| 3,327,119 | 6/1967 | Kamentsky | 250—83.3 |
| 3,364,358 | 1/1968 | Ashworth | 356—51 |
| 3,413,464 | 11/1968 | Kamentsky | 250—83.3 |

OTHER REFERENCES

Mellors et al.: Nuclear Acid Content of the Squamous Cancer Cell, Science, vol. 116, Sept. 12, 1952, pp. 265–269.

Mellors et al.: A Microfluorometric Scanner, Science, vol. 114, Oct. 5, 1951, pp. 356–360.

ARCHIE R. BORCHELT, Primary Examiner

U.S. Cl. X.R.

250—83.3; 356—51